Oct. 14, 1947.  E. L. OLSEN  2,428,984
REMOTE CONTROL MEANS FOR DIRECT CURRENT MOTORS
Filed April 29, 1943
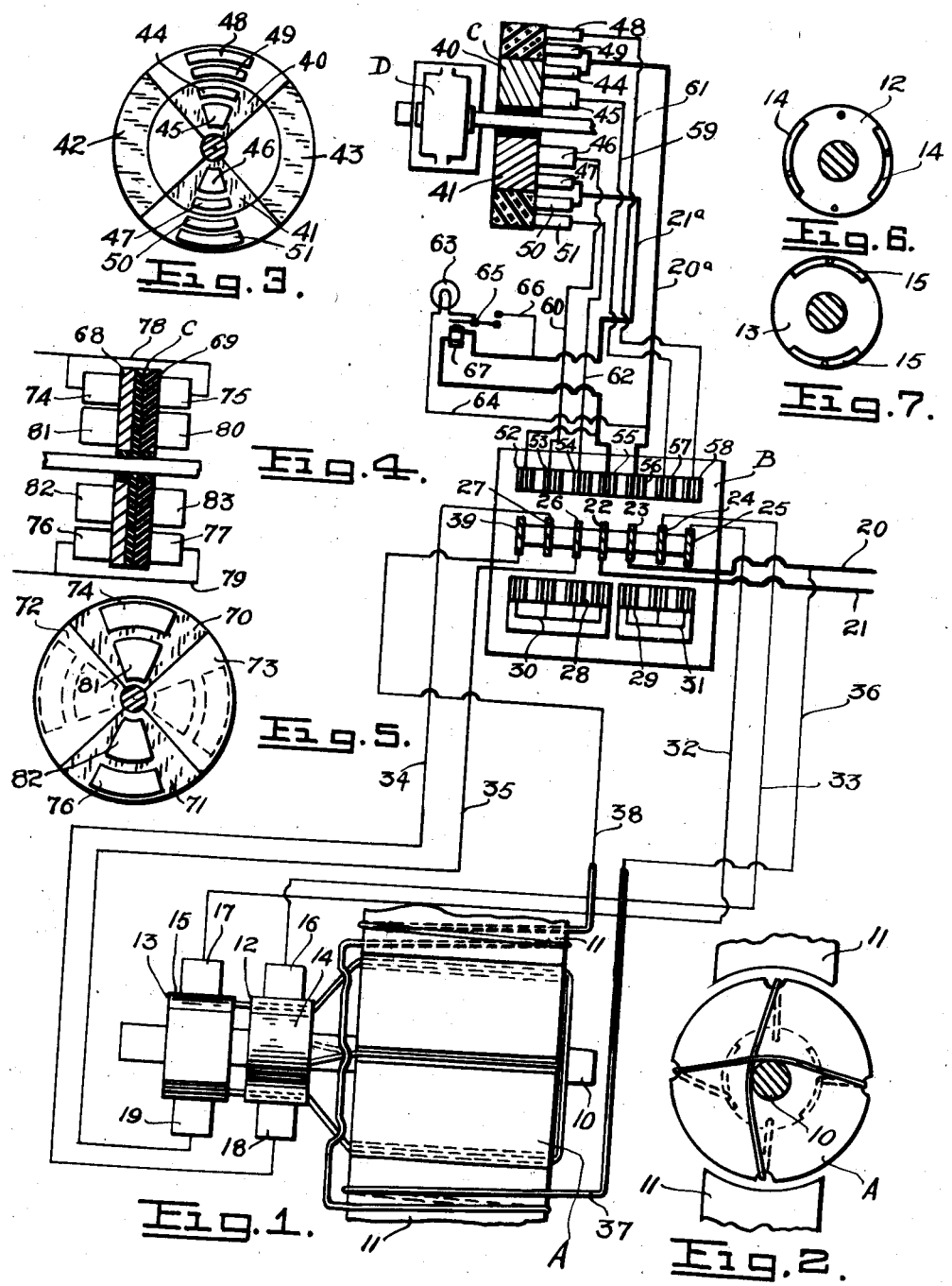
INVENTOR
E. L. OLSEN
By Fetherstonhaugh & Co.
ATT'YS Patented Oct. 14, 1947

2,428,984

UNITED STATES PATENT OFFICE 2,428,984

REMOTE-CONTROL MEANS FOR DIRECT-CURRENT MOTORS

Edgar Leonard Olsen, Weldon, Saskatchewan, Canada

Application April 29, 1943, Serial No. 485,022

5 Claims. (Cl. 172—276)

This invention relates to remote control means for direct current motors.

It is an object of the present invention to provide remote control means for direct current motors through which said motors may be controlled without varying the normal operating characteristics of the motor such as affecting the field.

A further object of the invention is to provide a remote control of this character which is of a particularly simple nature and which may be coupled with motors conveniently.

A still further object of the invention is to provide control means of the character referred to which may be readily connected with a motor or motors and readily disconnected therefrom so that the motors may be operated in the ordinary manner without such control.

With these and other objects in view the invention generally comprises a rotatable control member with means for rotating the latter, said control member being connected with the line and in series with commutator means carried on the shaft of the motor to transmit to the commutator means the corresponding armature displacement and/or speed of operation of the control member.

The invention will be clearly understood by reference to the following detailed specification taken in conjunction with the accompanying drawings.

In the drawings:

Fig. 1 is a schematic side elevation of the armature of a motor showing its wiring connections with one form of control member shown in section employed according to the present invention.

Fig. 2 is a schematic end view of the armature and magnets of the motor with the armature shaft shown in section.

Fig. 3 is a front elevation of the control member shown in Fig. 1 illustrating the position of the brushes and the contact members of the control member.

Fig. 4 is a sectional detail of an alternative form of control member illustrating the position of the brushes in relation thereto.

Fig. 5 is a front elevation of Fig. 4, and

Figs. 6 and 7 are elevations of the commutator rings for the motor armature illustrating between the two figures the relative positions of the metallic contacts of these two rings when mounted on the shaft for operation.

Referring to the drawings. A indicates the armature of any direct current motor which is carried on the shaft 10 and is designed to rotate within a series of magnets 11. The armature shaft carries a pair of independent commutator rings 12 and 13 which are connected in the usual manner with the armature and have contact plates 14 and 15 respectively spaced apart by insulation and disposed in alternative positions such as the relation illustrated between Figs. 6 and 7. Current is transmitted to the armature through the contact plates 14 and 15 by means of the brushes 16 and 17 and 18 and 19. Current is supplied to the brushes from the mains 20 and 21 which may be connected in circuit by means of the blades of a double throw switch B. In the present instance the mains 20 and 21 connect with the blades 22 and 23 of the switch B whereas the brushes 16 and 17 connect with the blades 24 and 25 and the brushes 18 and 19 with the blades 26 and 27. The switch blades may be thrown to engage the series of contact clips 28 and 29 each of which series are commonly connected by the wiring 30 and 31 respectively. Thus, if the blades are thrown into engagement with the clips 28 and 29 the brushes 16, 17, 18 and 19 are connected in circuit with the mains 20 and 21. In this connection the blades 24 and 25 are connected by way of the lead wires 32 and 33 respectively with the brushes 16 and 17. On the other hand, the blades 26 and 27 are connected by way of the lead wires 34 and 35 with the brushes 18 and 19. Consequently, when the blades engage the clips 28 and 29 current will flow from the main 20 through the blade 23, clips 29 and through either of the leads 32 and 33 to the brushes 16 and 17 depending upon their position and through the commutator rings 12 and 13 to the armature and return via the brushes 18 and 19, lead wires 34 and 35, to blades 26 and 27 and through contact clips 28 to the line 21 through the blade 22. In this way the motor may be operated in normal manner.

The magnets 11 when they are electromagnets may be connected with the line by way of the lead 36 which connects between the main 20 and the magnet wiring 37 which is wired in suitable manner such as illustrated to power the magnets and returns by way of the lead 38 to the blade 39 through the appropriate clip of the series 28.

In order to control the speed of the motor or motors by way of remote control and without affecting the field of the motor or motors being controlled, I provide a rotatable remote control unit C which may take several forms and which may be operated by a small motor D although any suitable means of rotation as may be desired may be employed. The form of unit C illustrated in Fig. 1 comprises a disc with metal contact sectors 40 and 41 and the alternate sectors 42 and 43, the former being directly in the path of the brushes 44, 45, 46 and 47, while the latter are directly in the path of the brushes 48, 49, 50 and 51. The control member C may be connected in circuit with the motor through the switch B, by means of the series of contact clips indicated at 52, 53, 54, 55, 56, 57 and 58, all of which are insulated one from another. When the blades of switch B are thrown into contact with the contact clips 52 to 58 current is carried by the main 20 through the blade 23, contact clip 56, through the main branch 20a to the brushes 44 and 49.

These brushes make contact with the metallic sectors 40, 41, 42 and 43 alternately as the rotary remote control unit C revolves, whereas the other side of the line 21a is connected in the circuit by way of the brushes 47 and 50 so that the current flows through the lead 20a and returns via the lead 21a.

Current is supplied intermittently from the rotary control unit C by the brushes 45, 46, 48 and 51 to the commutator unit comprised by the commutator rings 12 and 13 as follows: From the brush 45 connection is effected through the lead 59, through the contact clip 57, blade 24 of the switch B, lead 33, down to the commutator ring 12, the return circuit being effected through the lead 34 back to blade 27, through contact clip 53 and lead 60 to brush 46, thence through the contact 41 to the brush 47 and the other side of the line through branch 21a connecting in turn through the contact clip 55 with the other side of the line 21.

When the commutator unit C is rotated so as to bring the contact sectors 42 and 43 in contact with the brushes 48, 49, 50 and 51 current will flow from the branch 20a of the main 20 through the brush 49, contact 42 (Fig. 3), brush 48, lead 61 to the contact lip 58 of switch B through the blade 25, lead 32 and brush 17 to the commutator ring 13. The return flow will be through the lead 35, blade 26 and contact clip 54 of switch B then through lead 62 to the brush 51 and through contact 43 to brush 50 and to the main 21 through the branch 21a.

In consequence of this arrangement the motor or motors connected to the rotary control unit C through the switch B will be operated in accordance with the manner in which the control unit C is operated. On the other hand by swinging the blades of switch B to the opposite set of contact clips the control unit C is cut out of operation and the motor or motors concerned may be operated in normal manner directly from the mains 21 and 20.

When the motor or motors is switched from ordinary operation to remote control operation by throwing the blades of switch B over to the contacts 52 to 58 it is possible that the commutator rings 12 and 13 may not be correspondingly positioned with the rotary control unit C. For instance, the brush of one of the commutator rings might be engaging an insulated part of the ring while its corresponding contact on the contact unit is engaging the corresponding brush of the control unit. This, however, can be readily adjusted by rotating the unit C until the contacts thereof have been brought into proper position with those of the commutator rings 12 and 13. Moreover, in order to indicate that the rotary control member is in proper position in relation to the commutator rings of the motor a circuit may be incorporated to include a signal lamp of the other signalling means 63 connected in parallel with the mains through the lead 64 connected with the branch line 20a and on the other side of the signalling means with the branch line 21a through a movable contact member 65 and lead 66. The movable contact member may be actuated by an electromagnet 67 in series with the branch line 21a. When the movable contact 65 is out of contact with the lead 66 the contacts of the rotary control unit C are out of position in relation to the corresponding contacts of the commutator rings 12 and 13 as above referred to. However, when the control unit C has been rotated to position the corresponding contacts and rotary member C in proper relation to the commutator rings 12 and 13 the electromagnet 67 will be energized thus to cause movable contact 65 to engage the lead 66 thereby signalling that unit C has been brought into proper position with commutators 12 and 13.

Other forms of control unit might be used. For instance, an arrangement such as shown in Fig. 4 might be employed wherein the unit C is made up of two disk-like bodies 68 and 69, each as shown in Fig. 5, having two sector contacts 70 and 71 opposed to one another with intervening sector insulating portions 72 and 73. In this connection the brushes corresponding to the brushes 44 and 49 and 47 and 50 shown in Fig. 1 are replaced by the brushes 74 and 75 and 76 and 77 respectively, each pair being commonly connected by the leads 78 and 79 respectively with the branch lines 20a and 21a. Similarly, the contacts 45 and 48 are replaced by the contacts 80 and 81 respectively, while the contacts 46 and 51 are replaced by the contacts 82 and 83. This provides a compact form of rotary control unit C. Alternatively, however, the control unit C might duplicate the rings as 12 and 13.

Regardless of the type of rotary control unit C, just so long as it provides contacts which will correspond with those of the commutator unit employed in conjunction with the motor or motors, the rotary control unit will function as above described to control the operation of the motor or motors when the switch B is operated to connect the rotary control unit in circuit with the motor or motors.

The invention may be applied to function in various ways. By way of example, it may be used in the operation of drills at varying drilling speeds as may be required, having regard to the nature of the drilling operation to be performed. This will eliminate the necessity of gear reduction units, belt drives, etc. In this instance, it is only necessary to provide a small motor with a rheostat control and, for example, a speed indicator so that by the setting of the rheostat, the accurate speed of the drill operating motor, can be set in a very simple operation.

A still further illustration of the use of the remote control according to the invention would involve the principle of having certain mechanical operations carried out by a number of units, corresponding to the same operation carried out through a pilot control unit by means of a template, for instance. In other words, in conjunction with a number of lathes, the cutting operation might be carried out by following a template in connection with the pilot control unit and the actions of the template translated to the various lathes set for the purpose wherein the operation was carried out correspondingly by various mechanical means of translation. As an example, a pilot unit might be employed to control the operating speed of the lathes. A second pilot unit might be employed in connection with the tool slide so that the tool slide on the lathes would operate correspondingly whereas for a further simultaneous or successive operation that might be required, a third pilot unit might be employed to translate this operation to the series of lathes. In each case, the lathes would have a responding unit including a motor for each pilot unit of the control.

The foregoing are examples of some of the many uses to which the remote control unit may be applied.

It is apparent from the foregoing that the means of remote control produced by the present invention is particularly simple in character and may be caused to bring about efficient operation of a motor or motors of the direct current type to cause a predetermined armature displacement and/or provide for operation at selected speeds governed by the control unit and without affecting the field of the motors.

What I claim as my invention is:

1. A speed control for shunt and compound wound self or separately excited direct current motors comprising an insulated speed control member having at least two separate series of spaced contacts and a plurality of brushes designed intermittently to engage them, a commutator carried by the motor shaft and including at least two insulated slip rings having diametrically opposed conducting segments thereon, each connected to an opposite side of a motor armature coil and each contact extending over the surface of the slip ring for a number of electrical degrees corresponding to the degrees of contact with said rotary control contacts and their brushes, wiring means fed from the line supply and connected between said brushes and the segments of said slip ring and means for producing controlled relative movement between said control member and said brushes to engage said brushes alternately with each of said series of contacts whereby alternately to supply current to said armature coils through said slip rings to cause operation of said motor corresponding in speed to the rotation of said speed control member.

2. A speed control for shunt and compound wound self or separately excited direct current motors comprising a speed control member, a bank of brushes, said speed control member being a disk having at least two separate series of contacts, said disk being divided into sections by divisions extending radially from the centre and lines concentric with the centre, adjacent sections in an annular path being alternately insulated and conducting and forming one of said series of contacts, and adjacent sections in a radial direction being alternately insulated and conducting, said bank of brushes extending diametrically across said control member and being designed to intermittently engage the contacts thereon in a manner to alternately complete a circuit through the series of contacts thereon, a commutator carried by the motor shaft, said commutator having at least two insulated slip rings and having a number of pairs of diametrically opposed conducting segments mounted thereon, each segment extending along the surface of the ring for a number of degrees corresponding to the degrees in a radial division of said control disk and each segment being connected to one side of a separate armature coil, its diametrically opposite segment being connected to the opposite side of the same coil, wiring means connecting said commutator to the line through said brushes and control member, means for rotating said control member with respect to said bank of brushes to complete a circuit from the line supply alternately through each of said series of contacts whereby alternately to supply current to said armature coils through said slip rings to cause operation of said motor at a speed corresponding in speed to the rotation of said speed control member.

3. A speed control member as claimed in claim 2 having a signal means to indicate when the conducting segments on the commutator slip rings are in a corresponding position to the conducting segments on the rotary control member.

4. A speed control member as claimed in claim 2, said signal means comprising a signal light connected across the line and having an on-off switch operable by an electro magnet in series with the line.

5. A speed control for shunt and compound wound self or separately excited direct current motors comprising a speed control member, two banks of brushes, said speed control member being of disk-like character and having two separate series of contacts, said control member comprising a pair of contact disks and an intervening insulating disk, said contact disks being divided into four equal sections by divisions extending radially from their centres, adjacent sections in an annular path around said disk being alternately insulating and conducting and each of said disks forming one of said series of contacts, said banks of brushes being designed to extend diametrically across said contact disks and to intermittently engage the contacts thereon in a manner to alternately complete a circuit through the two series of contacts, a commutator carried by the motor shaft, said commutator having at least two insulated slip rings and having a number of pairs of diametrically opposed conducting segments mounted thereon, each segment extending along the surface of the ring for a number of degrees corresponding to the degrees in a radial division of said control disk and each segment being connected to one side of a separate armature coil, its diametrically opposite segment being connected to the opposite side of the same coil, wiring means connecting said commutator to the line through said brushes and control member, means for rotating said control member with respect to said bank of brushes to complete a circuit from the line supply alternately through each of said series of contacts whereby alternately to supply current to said armature coils through said slip rings to cause operation of said motor at a speed corresponding in speed to the rotation of said speed control member.

EDGAR LEONARD OLSEN.

REFERENCES CITED

The following references are of record in the file of this patent:

UNITED STATES PATENTS

| Number | Name | Date |
|---|---|---|
| 498,160 | Dyer | May 23, 1893 |
| 754,208 | Feller | Mar. 8, 1904 |
| 938,830 | Dawson et al. | Nov. 7, 1909 |
| 1,949,910 | Heckler | Mar. 6, 1934 |
| 2,264,076 | Groot et al. | Nov. 25, 1941 |
| 1,529,436 | Kellum | Mar. 10, 1925 |
| 1,178,128 | Britton | Apr. 4, 1916 |
| 2,340,094 | Whittaker | Jan. 25, 1944 |